(12) United States Patent
Octaviano, II et al.

(10) Patent No.: US 7,697,476 B2
(45) Date of Patent: Apr. 13, 2010

(54) EFFECTIVE MANAGEMENT OF OVERLAPPING WIRELESS CHANNELS

(75) Inventors: Raymond Gary Octaviano, II, Raleigh, NC (US); Daryl Cromer, Cary, NC (US); Philip John Jakes, Durham, NC (US); Howard Jeffrey Locker, Cary, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 41 days.

(21) Appl. No.: 11/480,266

(22) Filed: Jun. 30, 2006

(65) Prior Publication Data

US 2008/0002643 A1  Jan. 3, 2008

(51) Int. Cl.
*H04J 3/16* (2006.01)
*H04W 4/00* (2009.01)

(52) U.S. Cl. .................... 370/329; 370/338; 370/437
(58) Field of Classification Search .................. None
See application file for complete search history.

(56) References Cited

U.S. PATENT DOCUMENTS

| | | | |
|---|---|---|---|
| 5,844,905 A * | 12/1998 | McKay et al. | 370/443 |
| 6,732,163 B1 | 5/2004 | Halasz | |
| 6,771,960 B1 * | 8/2004 | Otting et al. | 455/434 |
| 7,146,133 B2 * | 12/2006 | Bahl et al. | 455/63.1 |
| 7,177,645 B2 * | 2/2007 | Goldhamer | 455/447 |
| 7,206,586 B2 * | 4/2007 | Kim et al. | 455/450 |
| 7,236,782 B2 * | 6/2007 | Utsunomiya et al. | 455/434 |
| 7,277,404 B2 * | 10/2007 | Tanzella et al. | 370/310 |
| 7,305,004 B2 * | 12/2007 | Sherman | 370/462 |
| 2002/0071448 A1 | 6/2002 | Cervello et al. | |
| 2004/0085896 A1 | 5/2004 | Banerjea et al. | |
| 2004/0196812 A1 | 10/2004 | Barber | |
| 2004/0218568 A1 | 11/2004 | Goodall et al. | |
| 2004/0218683 A1 | 11/2004 | Batra et al. | |
| 2004/0223476 A1 | 11/2004 | Jose et al. | |
| 2004/0257978 A1 | 12/2004 | Shao et al. | |
| 2005/0036465 A1 * | 2/2005 | Waxman et al. | 370/338 |
| 2006/0029073 A1 * | 2/2006 | Cervello et al. | 370/389 |

FOREIGN PATENT DOCUMENTS

| JP | 2004-112171 | 8/2004 |
|---|---|---|
| WO | WO-2004/064330 A1 | 7/2004 |

* cited by examiner

*Primary Examiner*—Melanie Jagannathan
(74) *Attorney, Agent, or Firm*—Ference & Associates LLC; Carlos Munoz-Bustamante

(57) ABSTRACT

An arrangement facilitating the connection of a client to a network through an access point, particularly in an area with overlapping 0.11n channels. Preferably, a client may communicate with two access points and "ask" one of them to stop transmitting long enough so as to facilitate communication with the other access point. Current specifications otherwise provide no workable arrangement for handling overlapping channels.

8 Claims, 4 Drawing Sheets

(1) THE CLIENT INITIALLY SCANS TO SEE WHICH APs IT CAN HEAR AND DETERMINE IF ANY OF THE AP CHANNELS OVERLAP.

(2) THE CLIENT ANALYZES BOTH OF THE AP SIGNALS AND SELECTS ONE AP (AP #2 IN THIS CASE) TO BE THE PRIMARY AP AND DESIGNATES THE OTHER AP AS THE SECONDARY AP.

EFFECTIVE MANAGEMENT OF OVERLAPPING WIRELESS CHANNELS

FIELD OF THE INVENTION

The present invention relates generally to wireless technology and the accessibility of multiple channels in a given environment.

BACKGROUND OF THE INVENTION

Wireless technology, such as that associated with computers (especially laptop computers) is rapidly emerging with new standards that bring new capabilities, higher bandwidths, and new challenges to the market. The industry is rapidly adopting these new standards and incorporating such standards into products. For example, the standard configuration on IBM ThinkPads was 0.11 b in 2003, 0.11 b/g in 2004, 0.11 a/b/g in 2005, and 0.11 a/b/g/n for 2006 and beyond.

For system producers, the incorporation of such technologies is normally reasonably straightforward. The technologies are "backward compatible", in that they fall back to accommodate 0.11 n, 0.11 a, 0.11 g, and 0.11 b, respectively. Therefore the PC OEMs (original equipment manufacturers) are comfortable in quickly incorporating the newer technologies since customers are provided with "investment protection" (or protection against obsolescence) all the same. Thus, while today the overwhelmingly prevalent installed base is 802.11 b, the machines being sold support 0.11 b, 0.11 g, and 0.11 a nonetheless.

It is presently accepted that in the future customers will be able to upgrade a network by upgrading the access points and then clients as rollouts continue. However, a problem has been recognized in connection with using multiple 802.11 n channels in a location where there are a small number of available channels. An industry group known as TGn Sync has proposed 40 MHz channels in order to meet 802.11 n specifications. However (as discussed above), 802.11 n is, by definition, backwards compatible with 802.11 a, 802.11 b, and 802.11 g, which are defined to use 20 MHz wide channels.

In cases where 802.11 n is used in places where there is a limited number of non-overlapping channels (such as the worldwide 2.4 GHz ISM band, which has a maximum of three 20 MHz non-overlapping channels, or where only a limited number of 5 GHz channels are available, such as in much of Asia & Latin America) there will clearly be interference between multiple 802.11 n Access Points. While two 40 MHz channels can be used in the 2.4 GHz spectrum, these will overlap. In areas where the overlapping channels are present, collisions can easily occur and transmissions will be disrupted when devices on the two channels transmit at the same time. The current WLAN specifications do not provide a method for operating in an overlapping channel environment.

Accordingly, a need has been recognized in connection with facilitating the use of multiple 802.11 n channels in environments that have hitherto not been conducive to the same.

SUMMARY OF THE INVENTION

There is broadly contemplated herein, in accordance with at least one presently preferred embodiment of the present invention, an arrangement facilitating the connection of a client to a network through an access point, particularly in an area with overlapping 0.11 n channels. Preferably, a client may communicate with two access points and "ask" one of them to stop transmitting long enough so as to facilitate communication with the other access point. Current specifications otherwise provide no workable arrangement for handling overlapping channels.

In summary, one aspect of the present invention provides a method of averting signal interference in a wireless network, the method comprising the steps of: providing a client; providing a first access point and a second access point, each of the first and second access points being capable of transmitting a signal able to overlap with a signal from the other of the first and second access points; selecting one of the first and second access points as a primary access point for the client; sending at least one request, from the primary access point, for a communication window for the client; establishing a communication window for the primary access point and the client; and during the established communication window, ceasing transmissions to the client from one or more access points capable of transmitting a signal able to overlap with a signal from the primary access point.

Another aspect of the invention provides an apparatus for averting signal interference in a wireless network which includes a client, a first access point and a second access point, each of the first and second access points being capable of transmitting a signal able to overlap with a signal from the other of the first and second access points, the apparatus comprising: an arrangement for selecting one of the first and second access points as a primary access point for the client; an arrangement for sending at least one request, from the primary access point, for a communication window for the client; an arrangement for establishing a communication window for the primary access point and the client; and an arrangement for ceasing transmissions, during an established communication window, ceasing from one or more access points capable of transmitting a signal able to overlap with a signal from the primary access point.

Furthermore, an additional aspect of the invention provides a program storage device readable by machine, tangibly embodying a program of instructions executable by the machine to perform method, the method comprising the steps of: providing a client; providing a first access point and a second access point, each of the first and second access points being capable of transmitting a signal able to overlap with a signal from the other of the first and second access points; selecting one of the first and second access points as a primary access point for the client; sending at least one request, from the primary access point, for a communication window for the client; establishing a communication window for the primary access point and the client; and during the established communication window, ceasing transmissions to the client from one or more access points capable of transmitting a signal able to overlap with a signal from the primary access point.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

Figure 1:
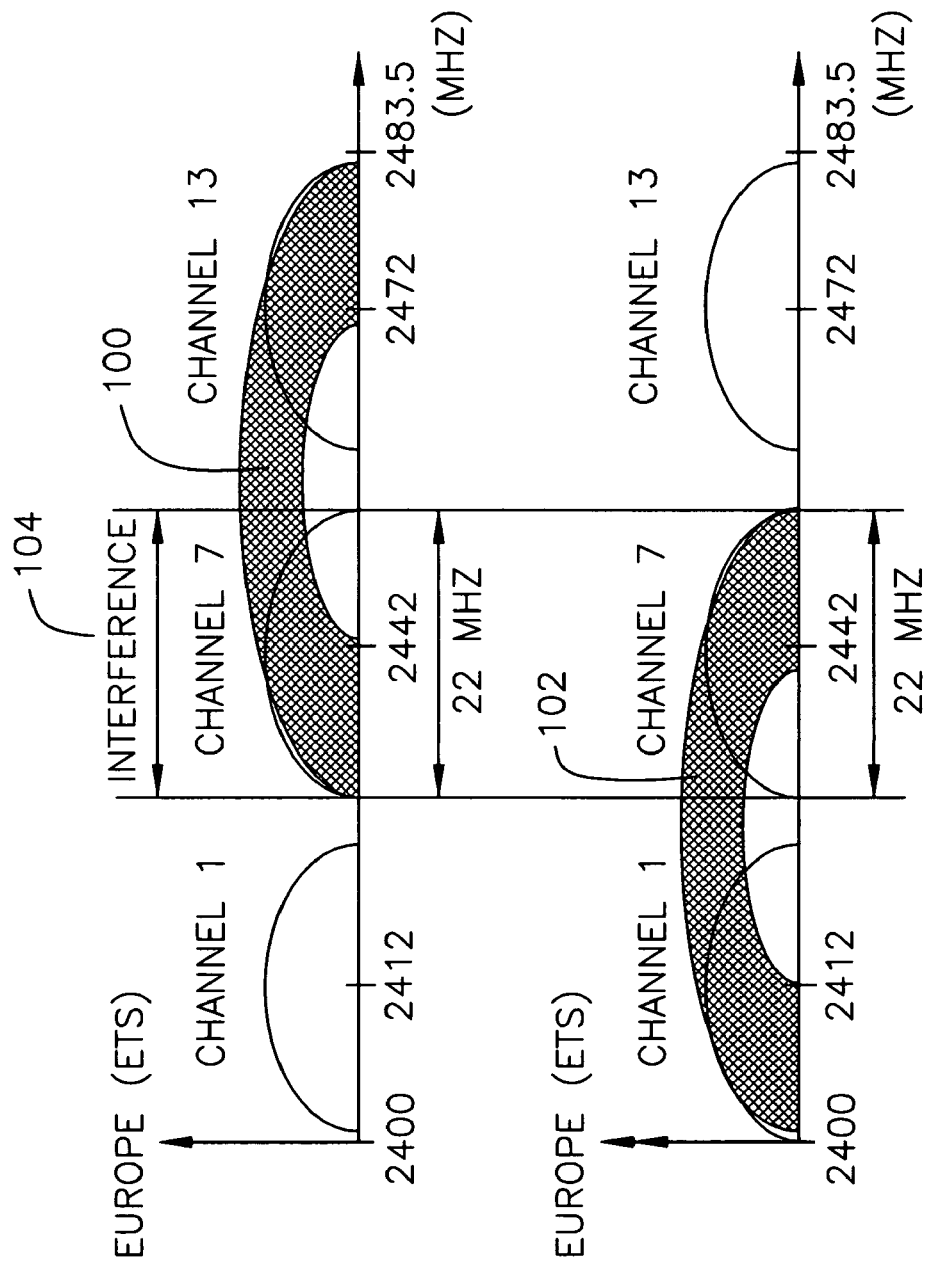
FIG. 1 graphically illustrates an interference problem with two 802.11 channels in a 2.4 GHz spectrum.

FIG. 1 graphically illustrates an interference problem with two 802.11 channels in a 2.4 GHz spectrum, particularly the worldwide 2.4 GHz ISM band. As shown, three channels that are each 20 MHz wide can normally be accommodated within such a spectrum; such channels are indicated here as channels 1, 7 and 13. Normally, within the spectrum in question, a maximum of three 20 MHz channels can coexist as shown without overlapping. To the extent that 40 MHz channels are introduced in such a context, a major problem with interference presents itself. Though technically two 40 MHz channels can be used in the 2.4 GHz spectrum, these will inevitably overlap. As shown a first such channel 100 may exist at an upper part of the spectrum with a second such channel 102 at a lower part of the spectrum. An inevitable area of overlap or interference is indicated at 104.

Figure 2:
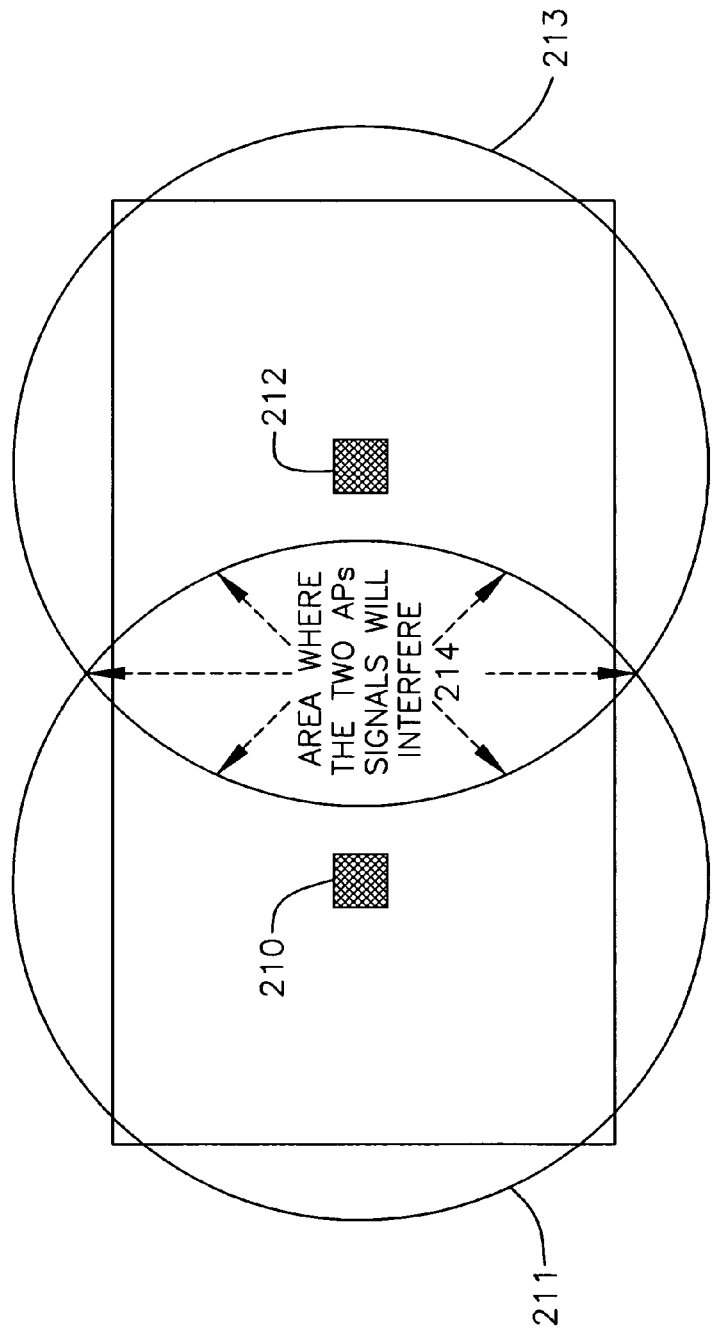
FIG. 2 illustrates essentially the same phenomenon as in FIG. 1, but showing signal ranges of two access points and an area of interference.

The problem may be further appreciated from FIG. 2. As shown, a first access point 210, corresponding to a given 40 MHz channel, may have a signal range indicated by circle 211 while a second access point 212, corresponding to another 40 MHz channel, may have its own signal range indicated by circle 213. A large area 214 exists where signals from the access points 210/212 will clearly interfere.

Figure 3A:
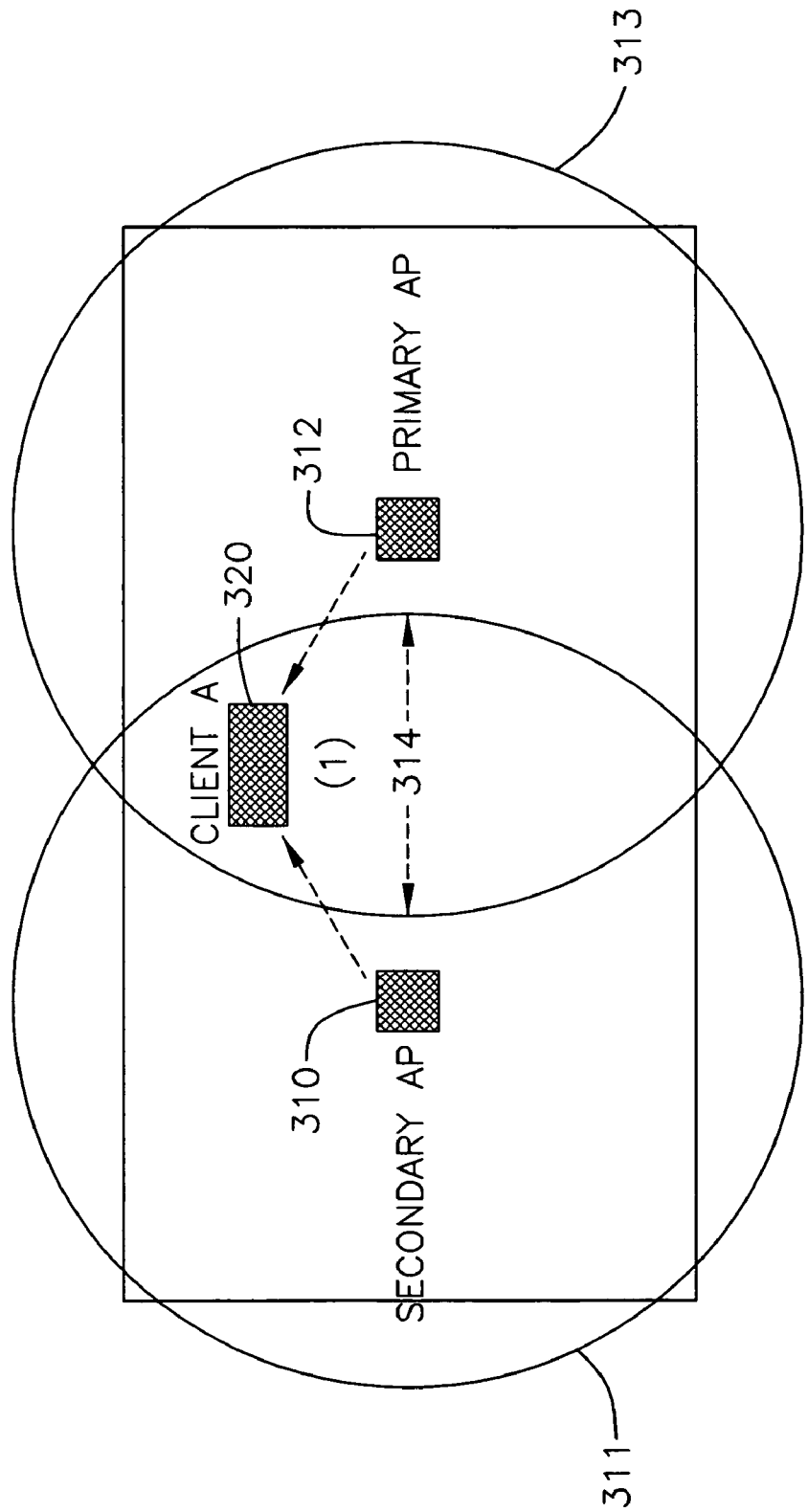
FIG. 3A illustrates a client in a position to choose from two access points.

FIG. 3A, configured similarly to FIG. 2, illustrates a "Client A" (320) in a position to choose from two access points 310 and 312, each access point corresponding to a different 40 MHz channel.

Preferably, in accordance with an embodiment of the present invention, Client A (320) will power on (e.g. via WLAN radio) and initially scan to see which access points it can "hear". This scan will reveal if Client A (320) can receive transmissions from two access points whose channels overlap (such as access points 310 and 312 as shown). If a situation with overlapping access points is indeed detected, then the Client A (320) will preferably "look" at the signal from each access point 310/312 and select one of them as a "primary AP (Access Point)" (here shown as AP 312) and the other as a "secondary AP" (here shown as AP 310). Client A (320) will then at least initially associate with the primary AP (here 312).

Figure 3B:
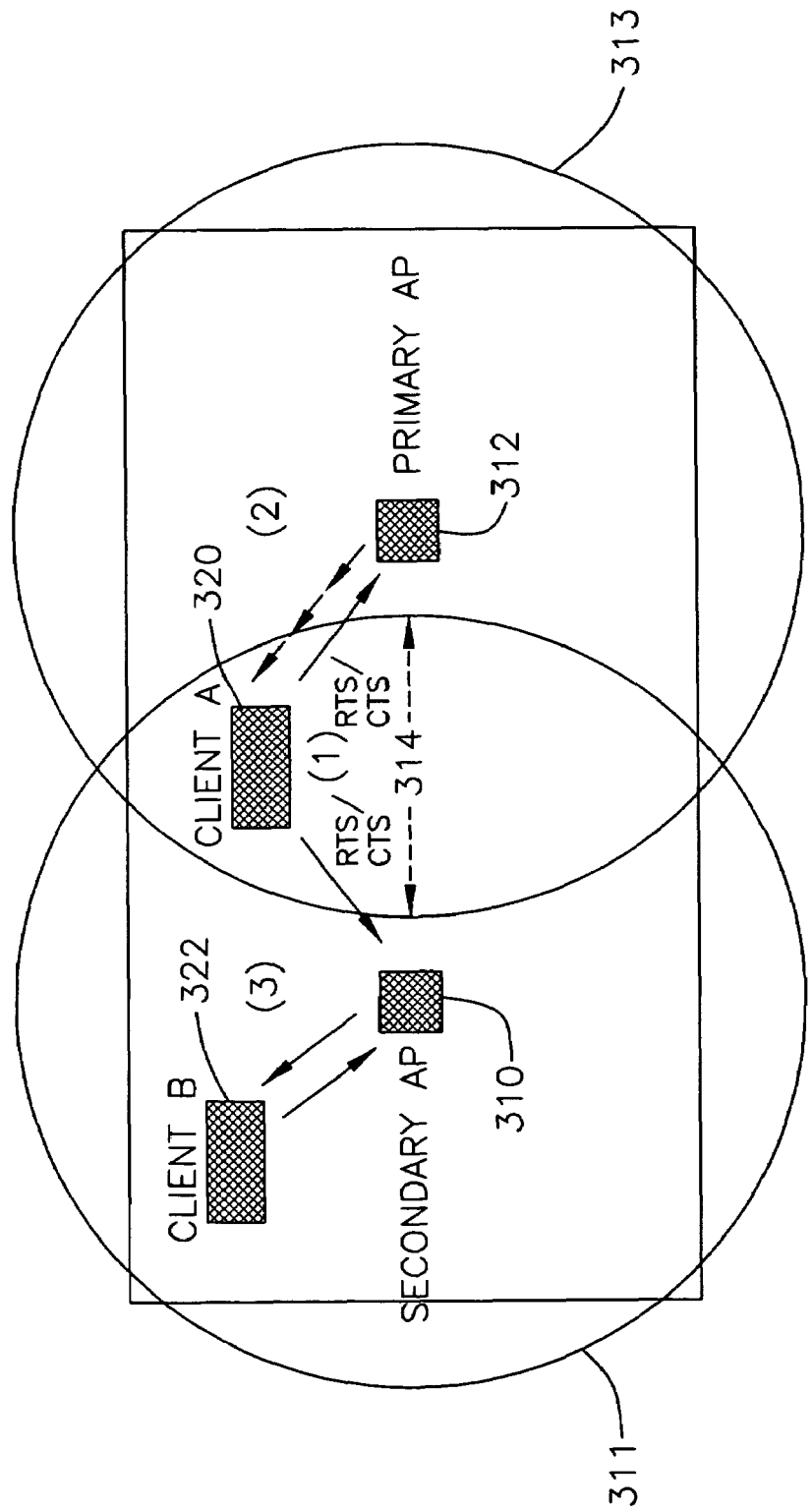
FIG. 3B is essentially the same illustration as FIG. 3B but showing the addition of a second client.

FIG. 3B is essentially the same illustration as FIG. 3B but showing the addition of a second client, or "Client B" (322). By way of an action indicated at (1), when Client A (320) is to send traffic to the primary AP (312), it preferably uses a Request to Send/Clear to Send (RTS/CTS) protocol to ask for a communication window from both AP's 310/312. The primary AP (312) will preferably then use the window to receive traffic from Client A (320) while the secondary AP (310) will not transmit during this window so as not to interfere with communications of Client A (320).

By way of an action indicated at (2), when the primary AP 312 has traffic to send to Client A (320), the primary AP 312 will send a request to Client A (320) for Client A (320) to set up a communication window. Inasmuch as transmissions from secondary 310 might present interference, this request will continue to be sent by primary AP 312 will send this request until Client A (320) responds. Client A (320) then sets up the communication window to ensure that all APs that would interfere with the transmissions refrain from transmitting during the communication window. While primary AP 312, with its different physical location from Client A (320), may not be able to "hear" all other APs that could potentially interfere with a signal at Client A's location, it should be appreciated that Client A (320) is in the best position to determine the possible interference for its specific location.

Finally, by way of an action indicated at (3), Client B (322) (or any other client outside of the interference area 314) can send and receive traffic with AP 310 (or any other AP associated with Client B (322)) in normal and unobstructed fashion since at this point Client B (322) will not receive interference from AP 312 (or another AP).

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
   scanning an area via a client to determine if transmissions from a plurality of access points will interfere;
   upon a determination by the client that transmissions from the plurality of access points to the client will interfere, selecting via the client a primary access point for the client;
   receiving at the client at least one request, from the primary access point, for a communication window for the client; and
   establishing a communication window via the client for the primary access point and the client; wherein establishing a communication window between the client and the primary access point ensures transmissions from all other access points available to the client cease, thereby preventing transmission of interfering signals;
   wherein the transmissions from the plurality of access points comprise interfering transmissions on one or more 40 MHz channels;
   wherein the one or more 40 MHz channels comprise 802.11 channels in a 2.4 GHz spectrum; and
   wherein the one or more 40 MHz channels utilize frequencies normally occupied by at least two adjacent and non-interfering 802.11 20 MHz channels in a 2.4 GHz spectrum having a maximum of three 802.11 20 MHz non-interfering channels.

2. The method according to claim 1, wherein said selecting further comprises designating another access point as a secondary access point for the client.

3. The method according to claim 2, further comprising ceasing transmissions to the client from the secondary access point during the communication window.

4. The method according to claim 1, wherein said scanning an area via the client comprises utilizing a WLAN radio of the client.

5. The method according to claim 4, wherein the client is a laptop computer.

6. An apparatus comprising:

a processor;

an arrangement for scanning an area to determine if transmissions to the apparatus from a plurality of access points will interfere;

an arrangement for selecting one of the plurality of access points as a primary access point for the apparatus upon a determination by the apparatus that transmissions from the plurality of access points to the apparatus will interfere;

an arrangement for receiving at least one request, from the primary access point, for a communication window for the apparatus; and an arrangement for establishing a communication window for the primary access point and the apparatus; wherein the established communication window between the apparatus and the primary access point ensures transmissions from all other access points available to the apparatus cease, thereby preventing transmission of interfering signals;

wherein the transmissions to the apparatus from the plurality of access points comprise interfering transmissions on one or more 40 MHz channels;

wherein the one or more 40 MHz channels comprise 802.11 channels in a 2.4 GHz spectrum; and wherein the one or more 40 MHz channels utilize frequencies normally occupied by at least two adjacent and non-interfering 802.11 20 MHz channels in a 2.4 GHz spectrum having a maximum of three 802.11 20 MHz non-interfering channels.

7. The apparatus according to claim 6, wherein said arrangement for selecting acts to designate another access point as a secondary access point for the client.

8. The apparatus according to claim 7, wherein said arrangement for establishing a communication window acts to cease transmissions to the client from the secondary access point.

* * * * *